United States Patent
Pellet et al.

(10) Patent No.: US 8,220,150 B2
(45) Date of Patent: Jul. 17, 2012

(54) SPLIT VANE CLUSTER REPAIR METHOD

(75) Inventors: Paul M. Pellet, Arlington, TX (US); David J. Hiskes, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 1456 days.

(21) Appl. No.: 11/805,136

(22) Filed: May 22, 2007

(65) Prior Publication Data

US 2008/0289179 A1  Nov. 27, 2008

(51) Int. Cl.
  *B23P 6/00*  (2006.01)
(52) U.S. Cl. ... 29/889.1; 29/889; 29/889.21; 29/889.71; 415/189; 415/209.2
(58) Field of Classification Search ....... 29/889–889.23, 29/889.6–889.722; 415/209.2, 189; 416/96 R
See application file for complete search history.

(56) References Cited

U.S. PATENT DOCUMENTS

| | | |
|---|---|---|
| 2,579,583 A | 12/1951 | Johnson |
| 3,182,955 A | 5/1965 | Hyde |
| 3,797,085 A | 3/1974 | Aartman |
| 4,050,133 A | 9/1977 | Cretella et al. |
| 4,176,433 A | 12/1979 | Lee et al. |
| 4,194,869 A | 3/1980 | Corcokios |
| 4,305,697 A | 12/1981 | Cohen et al. |
| 4,326,833 A | 4/1982 | Zelahy et al. |
| 4,726,101 A | 2/1988 | Draghi et al. |
| 4,856,963 A | 8/1989 | Klapproth et al. |
| 5,071,054 A | 12/1991 | Dzugan et al. |
| 5,174,715 A | 12/1992 | Martin |
| 5,248,240 A | 9/1993 | Correia |
| 5,269,057 A * | 12/1993 | Mendham ............ 29/889.1 |
| 5,690,469 A | 11/1997 | Deal et al. |
| 5,732,468 A * | 3/1998 | Galley et al. ........ 29/889.1 |
| 5,758,416 A | 6/1998 | Reverman et al. |
| 5,765,993 A * | 6/1998 | Weiss ................ 415/209.2 |

(Continued)

FOREIGN PATENT DOCUMENTS

EP  0474484 A2  3/1992

(Continued)

OTHER PUBLICATIONS

G.E. Co., "GE Aircraft Engines: Service Solutions Newsletter," available at http://web.archive.org/web/20031011011959/http://geae.com/services/information/servicesolutions/v03/v03i05a01.html, as available on Oct. 11, 2003 (2 pages).

(Continued)

*Primary Examiner* — Richard Chang
(74) *Attorney, Agent, or Firm* — Kinney & Lange, P.A.

(57) ABSTRACT

A method of repairing a vane cluster for a gas turbine engine includes attaching a first registration block to a salvageable airfoil segment of the vane cluster, machining a face of the first registration block relative to datum surfaces of the vane cluster, removing a damaged airfoil segment from the vane cluster, adding new material to the salvageable airfoil segment, joining a replacement airfoil segment having a second registration block to the salvageable airfoil segment to replace the damaged airfoil segment, removing the first registration block, and removing the second registration block. The respective first and second registration blocks of the salvageable airfoil segment and the replacement airfoil segment are aligned in a configuration substantially identical to a configuration of the vane cluster prior to undergoing repair.

20 Claims, 6 Drawing Sheets

U.S. PATENT DOCUMENTS

| | | | |
|---|---|---|---|
| 6,154,959 | A | 12/2000 | Goodwater et al. |
| 6,173,491 | B1 * | 1/2001 | Goodwater et al. ......... 29/889.1 |
| 6,179,567 | B1 | 1/2001 | Stauffer et al. |
| 6,210,108 | B1 * | 4/2001 | Ebacher ........................ 415/189 |
| 6,394,750 | B1 | 5/2002 | Hiskes |
| 6,416,278 | B1 | 7/2002 | Caddell, Jr. et al. |
| 6,508,000 | B2 * | 1/2003 | Burke et al. ................. 29/889.1 |
| 6,546,627 | B1 * | 4/2003 | Sekihara et al. ............. 29/889.1 |
| 6,553,665 | B2 | 4/2003 | Gunn et al. |
| 6,685,431 | B2 | 2/2004 | Hiskes |
| 6,785,961 | B1 * | 9/2004 | Caddell et al. ............... 29/889.1 |
| 6,793,457 | B2 | 9/2004 | Caddell et al. |
| 6,814,544 | B2 * | 11/2004 | Tsukamoto et al. ........ 416/96 R |
| 6,905,308 | B2 | 6/2005 | Hagle et al. |
| 7,101,150 | B2 | 9/2006 | Bash et al. |
| 7,121,793 | B2 | 10/2006 | Correia |
| 7,185,433 | B2 | 3/2007 | Miller et al. |
| 2005/0254944 | A1 | 11/2005 | Bash et al. |
| 2005/0268462 | A1 | 12/2005 | Beverley et al. |
| 2007/0084052 | A1 | 4/2007 | Heinrich et al. |

FOREIGN PATENT DOCUMENTS

| | | |
|---|---|---|
| EP | 0903467 A2 | 3/1999 |
| EP | 1099508 A2 | 5/2001 |
| EP | 1607581 A1 | 12/2005 |
| GB | 734210 | 7/1953 |

OTHER PUBLICATIONS

Chromalloy Nevada, "Services—Repair," from http://www.chromalloy-cnv.com/Services.html, visited Apr. 12, 2007 (14 pages).

Official Search Report of the European Patent Office in foreign Application No. 08251785.5, filed May 22, 2008.

* cited by examiner

SPLIT VANE CLUSTER REPAIR METHOD

BACKGROUND OF THE INVENTION

The present invention relates to a method for repairing vanes for gas turbine engines, and more particularly to a method suitable for repairing high pressure turbine (HPT) nozzle segments for gas turbine engines.

Over time, components of gas turbine engines are prone to damage and wear. Components in the "hot" section of the engine are particularly prone to damage brought on by high temperature and pressure conditions. The high pressure turbine (HPT) nozzle segments, which are vane structures located immediately aft of a combustor in many gas turbine engine designs, are components that can experience a significant amount of corrosion and wear problems. However, replacing damaged parts like the HPT nozzle segments with entirely new replacement parts is expensive. It is desirable from a cost savings perspective to salvage or reuse existing components where suitable repairs can be made. However, component geometries may make repairs to some portions of the component impossible without cutting the component into pieces (to provide access to otherwise inaccessible portions of the component), repairing it and then reassembling it. In addition, some types of corrosion cannot be removed from a component without creating unrepairable "potholes".

A number of existing methods are known for repairing vanes of a high pressure turbine (HPT) nozzle segment of a gas turbine engine. For example, U.S. Pat. No. 3,182,955 to Hyde states that it was known in the art to cut apart adjacent vane or blade segments (i.e., vane or blade singlets) in order to replace a damaged singlet with a new replacement part. U.S. Pat. No. 4,176,433 to Lee et al. discloses cutting apart two vane segments (or vane clusters), salvaging two halves of the respective segments, and then joining two salvaged halves of the vane segments to form a salvaged vane segment in the original configuration (i.e., blueprint configuration). Furthermore, U.S. Pat. No. 6,785,961 to Caddell, Jr. et al. discloses a repair process essentially identical to those of Hyde and Lee et al. that uses a newly manufactured singlet joined to a salvaged vane singlet (i.e., half of an original vane segment structure).

While methods of cutting apart vane segments and joining the salvaged half (i.e., singlet) with a new or salvaged singlet are known, existing methods do not disclose reliable methods for precisely aligning the airfoils of the repaired vane segment at original blueprint specifications. The cutting and joining process can add variations and increase dimensional tolerances to a point where the alignment of the airfoils of a repaired vane segment are less than optimal (e.g., throat dimensions between adjacent airfoils), which can lead to undesired engine performance losses. In particular, datum surfaces of the original part that determine the mounting alignment of the part in an engine can be effectively destroyed through repair processes that add material to the damaged component, as well as through the process of cutting apart and rejoining halves of a component to effectuate necessary repairs. Thus, it is desired to provide an improved vane segment repair method that facilitates more precise tolerances and vane segment subcomponent positioning.

BRIEF SUMMARY OF THE INVENTION

A method of repairing a vane cluster for a gas turbine engine includes attaching a first registration block to a salvageable airfoil segment of the vane cluster, machining a face of the first registration block relative to datum surfaces of the vane cluster, removing a damaged airfoil segment from the vane cluster, adding new material to the salvageable airfoil segment, joining a replacement airfoil segment having a second registration block to the salvageable airfoil segment to replace the damaged airfoil segment, removing the first registration block, and removing the second registration block. The respective first and second registration blocks of the salvageable airfoil segment and the replacement airfoil segment are aligned in a configuration substantially identical to a configuration of the vane cluster prior to undergoing repair.

DETAILED DESCRIPTION

In general, the present invention relates to a method for repairing vanes for gas turbine engines, for example, in a high pressure turbine (HPT) nozzle segment (synonymously called a "vane cluster" or "doublet"). In some engines, multiple HPT nozzle segments are positioned adjacent to one another to form an annular nozzle vane assembly located between a combustor assembly and a HPT first stage rotor assembly. Each HPT nozzle segment can be substantially identical and can include an outer platform, an inner platform, and two airfoils located between the inner and outer platforms. The airfoils typically include cooling openings. The inner platform defines a front face and a rear (or aft) face. An inner flange and two connection tabs extend inward from the inner platform. The outer platform defines a forward face and a rear (or aft) face defined on an outer flange. A pair of forward connection tabs and a pair of rear connection tabs extend outward from the outer platform. With nozzle segments having a simply supported vane configuration, the rear (aft) side of the inner flange and the rear face of the outer platform provide datum surfaces for the mounting of an original part in the engine. Furthermore, the nozzle segment can be formed of a superalloy, such as a nickel-based or cobalt-based superalloy.

Figure 1:
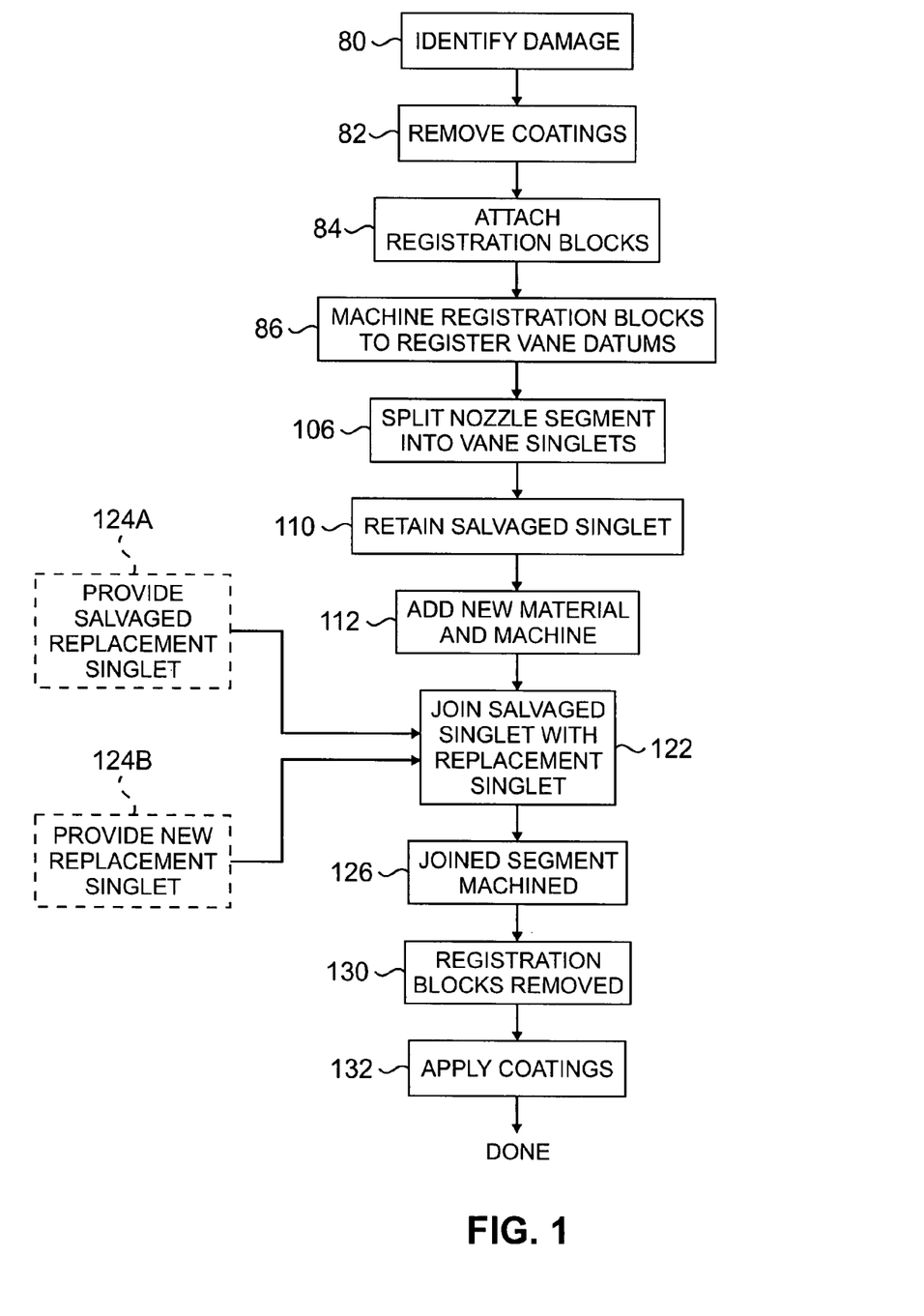
FIG. 1 is a flow chart of a repair method according to the present invention.

In use, HPT nozzle segments can become damaged due to corrosion, wear, or other factors. FIG. 1 is a flow chart of a method for repairing an HPT nozzle segment. Steps in the repair process shown in FIG. 1 are explained in detail below with reference to FIGS. 2-5. A first step of the process illustrated in FIG. 1 involves identifying damage to the HPT nozzle segment (step 80), which can include the identification of repairable damage and non-repairable damage. Damage identification (step 80) also includes identifying at least one half of the segment that is salvageable, that is, a half of the segment that can be reused either with or without repair. In order for a component to be considered repairable, the component or a portion thereof must generally have damage that falls within repairable limits for intended repair processes (e.g., welding, diffusion brazing, etc.). Next, the nozzle segment to be repaired is separated from adjacent parts (e.g., seals), and coatings are removed from the nozzle segment (step 82). The particular processes used to remove coatings (step 82) can vary depending on the particular coatings present.

Registration blocks are then attached to the nozzle segment (step 84), which can be accomplished by welding, brazing or other firm attachment processes. Once the registration blocks are attached, they are machined to register vane datums in a desired number of dimensions (step 86). Steps 84 and 86 of the repair process can be better understood with reference to FIG. 2, which is a perspective view of a HPT nozzle segment 88 having machined registration blocks 90A-90D (collectively 90) attached thereto. The registration blocks 90A-90D are each generally trapezoidal-shaped, and are made of a metal such as steel. In the illustrated embodiment, the registration blocks 90A and 90B are attached to an inner side of an inner flange 92 of the nozzle segment 88 and the registration blocks 90C and 90D are attached to an outer side of an outer flange 94, such that the registration blocks 90 are supported by outer and inner platforms 96 and 98 of the nozzle segment 88.

Figure 2:
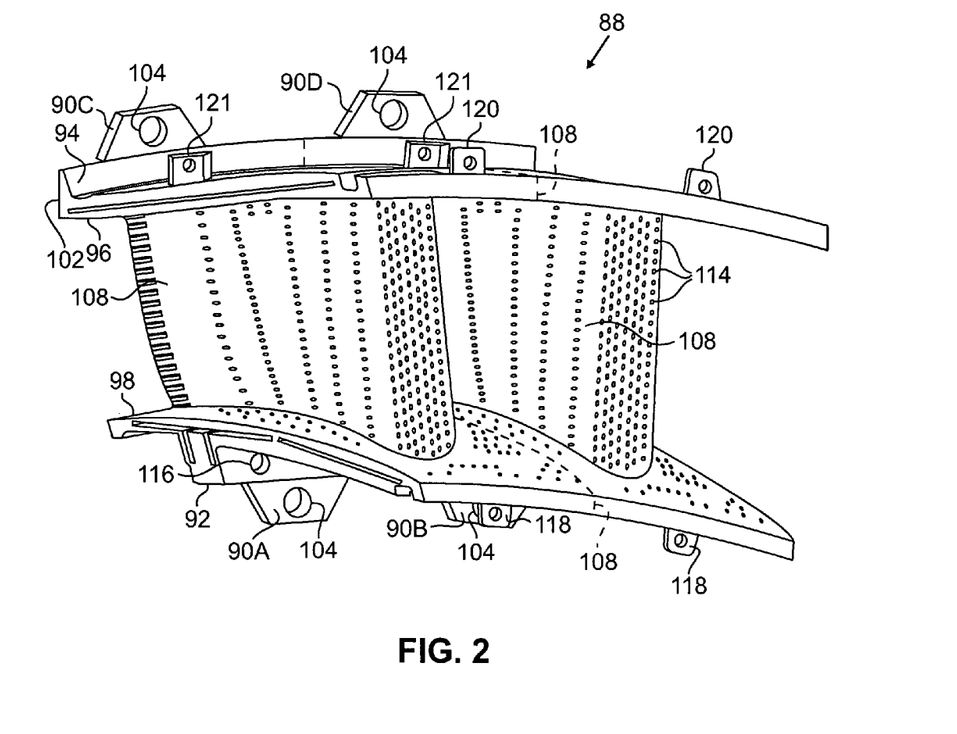
FIG. 2 is a perspective view of the HPT nozzle segment having registration blocks attached thereto.

Datums can be registered in the registration blocks 90A-90D in three dimensions. The new datum surfaces are registered in the registration blocks to known dimensions that relate to original datum surfaces or other locating features of the original part, such as flowpath surfaces of the airfoils. This registration of new datums is advantageous because the new datum surfaces can be protected and maintained at constant, fixed locations while repairs are performed on the portions of the nozzle segment 88, despite that fact that the original datum surfaces may be distorted or effectively destroyed by those repair processes. In the illustrated embodiment, the rear (aft) sides of the registration blocks 90A-90D are each machined (step 86) to provide new axial datum surfaces that are aligned in a specified arrangement relative to the original engine axial direction datum surfaces of the nozzle segment 88 (i.e., the mount surfaces at the rear side of the inner flange 92 and a rear face 102 of the outer platform 96). At the machining step (step 86), holes 104 are also drilled in the registration blocks 90A-90D to define radial direction datum surfaces, including both engine circumferential datum surfaces and height above engine centerline datum surfaces. The holes 104 also enable a suitable support fixture to be attached thereto to hold the nozzle segment 88 during repair. It should be noted that the particular datum surfaces registered can vary as desired for particular applications.

Turning again to the flow chart of FIG. 1, the next step in the repair process is to split the nozzle segment 88 into two parts (step 106). The nozzle segment 88 is cut apart approximately in half, to form two "singlets" (or airfoil segments), which are structures having a single airfoil 108 located between portions of the outer and inner platforms 96 and 98. The nozzle segment 88 can be cut apart using wire electrical discharge machining (EDM), or other suitable processes. The nozzle segment 88 is often manufactured as two casting singlets that are brazed together. When the nozzle segment 88 is cut apart during step 106 of the repair process, the cut is generally made at or near the original braze location joining the original cast singlets. In FIG. 2, a cut location 108 for splitting the vane segment 88 into two singlets is shown at or near an original braze location of the nozzle segment 88. Typically the cut is made at the location 108, which divides the nozzle segment 88 into two substantially equal halves or singlets, although in alternative embodiments of the present repair method a cut could be made at a different location. The nozzle segment 88 is generally secured during the cutting process by a fixture attached to the registration blocks 90A-90D. Once the nozzle segment 88 is cut apart at the cut location 108, a salvageable singlet is retained (step 110). In some cases, the method of the present invention can be applied where the nozzle segment 88 must be cut apart to repair otherwise inaccessible areas, in which case both singlets are salvaged and retained. However, the repair method can also be used where one singlet is unrepairable, in which case the unrepairable singlet can be scrapped (e.g., melted down for use in new castings or otherwise discarded).

Next, new material is added to the salvaged singlet (step 112). A brazing process such as conventional diffusion brazing can be used, or any other suitable build-up process. The salvaged singlet can be retained in a suitable fixture attached to the holes 104 in the registration blocks 90 while the new material is added. The particular locations where new material is applied to build up the salvaged singlet will vary for each repair, depending on the particular areas of the singlet that are damaged and the particular repair processes used to redress existing damage. However, by way of example and not limitation, typical areas where new material is added include the perimeters of the outer and inner platforms 96 and 98, the inner flange 92, the outer flange 94, cooling openings 114 in the airfoil 108 (see FIG. 2), mount holes 116 in the inner flange 92 (see FIG. 2), pin holes in connection tabs 118, 120 and 121, machined areas (e.g., at the cut location 108), areas with cracks or gouges, and other locations with damage. It should be noted that the datum surfaces of the registration blocks 90 are generally protected when new material is added, in order to preserve the integrity of those new datum surfaces in conjunction with completing repairs and re-installing the finished part.

Figure 3A:
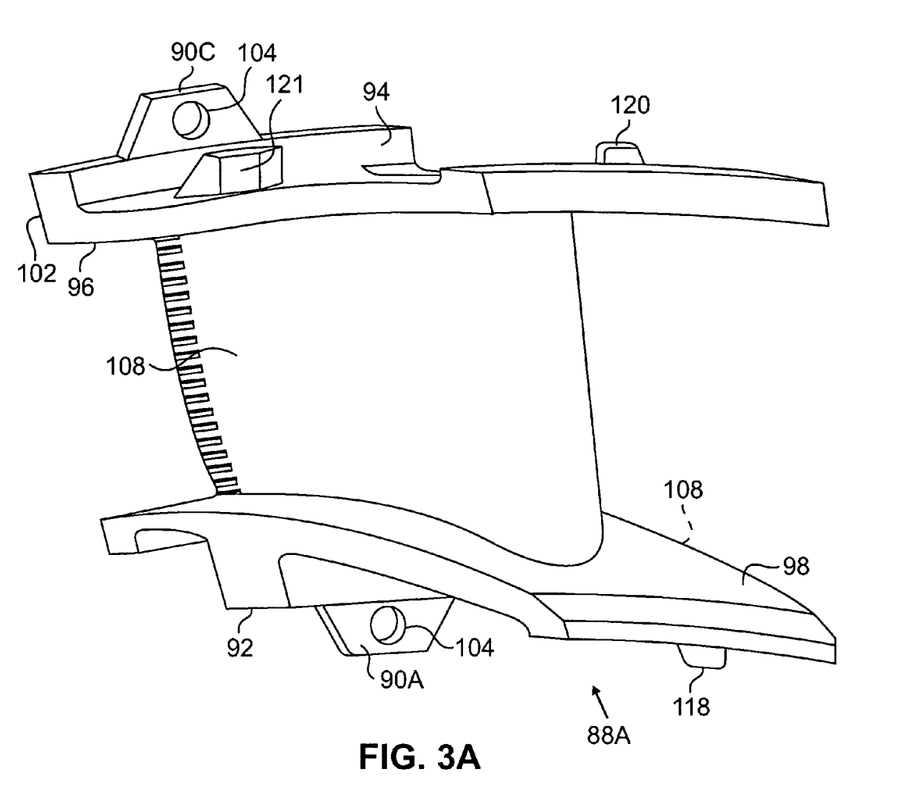
FIG. 3A is a perspective view of a salvaged vane singlet cut from the original HPT nozzle segment and having material added.

FIG. 3A is a perspective view of a salvaged vane singlet 88A that has been cut from the original HPT nozzle segment 88 shown in FIG. 2. The salvaged singlet 88A as shown in FIG. 3A has had new material added subsequent to being cut from the nozzle segment 88. For example, the cooling openings 114 have been filled in, material has been added at the perimeters of both the outer and inner platforms 96 and 98, and material has been added where machining was performed at the cut location 108. As noted above, the areas where new material is added for a particular repair will vary as desired.

Once new material has been added, the salvaged singlet 88A is then machined as part of step 112. Machining is typically performed at a surface where the singlet will later be joined to a replacement singlet to form a repaired nozzle segment having original blueprint specifications (i.e., at approximately the cut location 108). As part of this machining process of step 112, cooling openings 114, mount holes 116 and any other desired holes are re-drilled. Because build up processes used to add new material are typically not dimensionally precise, the original datum surfaces are typically distorted or effectively destroyed (as shown in FIG. 3A). Thus, machining and other processes of step 112 are conducted with reference to the datum surfaces of the registration blocks 90A and 90C in order to preserve as close as possible the original dimensions of the salvaged singlet 88A.

As shown in FIG. 1, the next step in the process is joining the salvaged singlet 88A to a replacement singlet (step 122). The replacement singlet can be either a salvaged singlet or a newly manufactured singlet. If a salvaged singlet is used (step 124A), a suitable salvaged replacement singlet can be obtained by performing substantially the same steps as described above on either the remaining singlet of the original nozzle segment 88 or on a different HPT nozzle segment having a salvageable singlet that is complementary to the salvaged singlet 88A. Alternatively, if a newly manufactured singlet is used (step 124B), the new replacement singlet is generally cast in a suitable shape and then machined to obtain desired dimensions and to form desired holes and openings therein. The new replacement singlet can include integrally cast registration blocks or registration blocks attached in a manner similar to that described above with respect to salvaged parts. It is possible to cast the new replacement singlet using scrapped material from a discarded, unrepairable singlet. Often, the choice between using a salvaged replacement singlet (step 124A) or a newly manufactured replacement singlet (step 124B) will be influenced by the availability of a suitable salvaged replacement singlet.

Figure 3B:
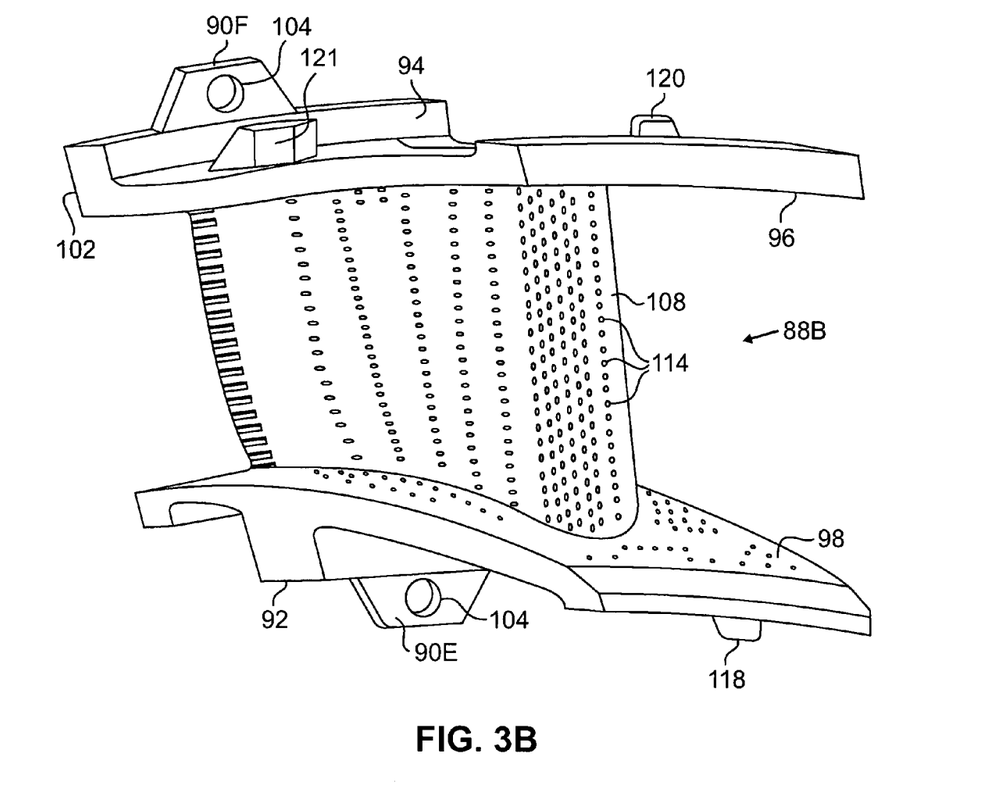
FIG. 3B is a perspective view of a newly manufactured replacement vane singlet.

FIG. 3B is a perspective view of a newly manufactured replacement vane singlet 88B. In the illustrated embodiment, the new singlet 88B includes integrally cast registration blocks 90E and 90F that are machined to form datum surfaces (defined relative to a nest or other feature of the airfoil 108). In other respects, the new singlet 88B is configured substantially the same as the salvaged singlet 88A after new material has been added and subsequent machining performed (although the new singlet 88B is configured to be complementary to the salvaged singlet 88A for joining). For simplicity, the remainder of the repair process is described with reference to the use of the new replacement singlet 88B, although it should be recognized that substantially the same repair steps would apply if a salvaged replacement singlet were used instead.

In order to join the salvaged singlet 88A and the replacement singlet 88B (step 122), a conventional diffusion brazing process or any other suitable process can be used. The singlets 88A and 88B are retained by a fixture that attaches at the registration blocks 90A, 90C, 90E and 90F during the joining process, which allows the two singlets 88A and 88B to be positioned with a relatively high degree of precision with respect to the new datum surfaces of the registration blocks 90A, 90C, 90E and 90F. In other words, specific features of the singlets 88A and 88B, such as flowpath surfaces of the airfoils 108 and mount surfaces, can generally be positioned at original blueprint locations with a higher degree of precision than if repairs were conducted without fixing new datum surfaces on the registration blocks 90. In conjunction with the joining step (step 122), additional new material can be added to a resultant joined nozzle segment 88' in some circumstances. However, the majority of new material added to build up the parts is typically performed prior to joining.

Figure 4:
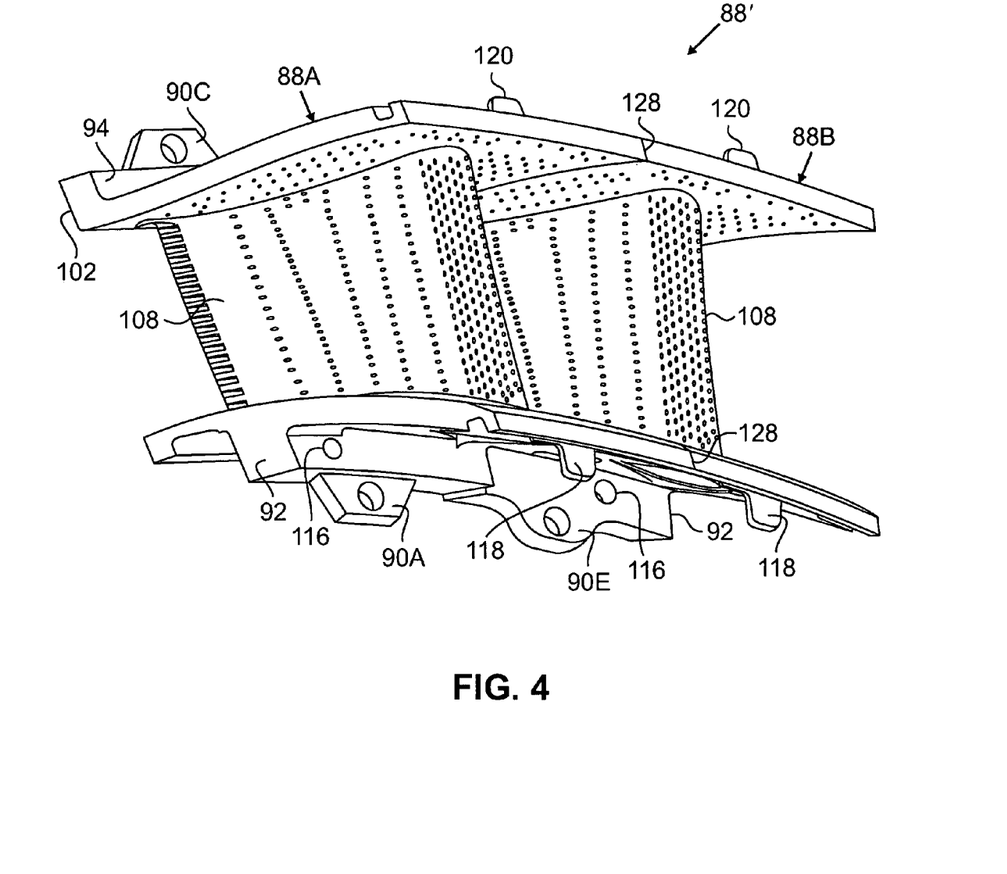
FIG. 4 is a perspective view of the salvaged vane singlet of FIG. 3A and the newly manufactured replacement vane singlet of FIG. 3B joined together.

FIG. 4 is a perspective view of the salvaged vane singlet of FIG. 3A and the newly manufactured replacement vane singlet of FIG. 3B joined together to form a nozzle segment 88'. As described in greater detail below, a series of additional repair steps can modify the nozzle segment 88' such that it closely matches original blueprint specifications.

As shown in FIG. 1, the next step in the repair process is to machine the joined nozzle segment 88' (step 126). This machine step includes machining the joint 128 where the two singlets 88A and 88B meet at the respective outer and inner platforms 96 and 98, in order to remove unwanted material present as a result of the dimensionally imprecise joining process (e.g., diffusion brazing). In addition, intermediate datum surfaces are established on the connection tabs 118 and 121 through machining. These intermediate datum surfaces are defined with respect to the new datum surfaces of the registration blocks 90. As such, the intermediate datum surfaces include twice the tolerances of the new datum surfaces, and therefore are less precise. However, this is contemplated within the repair process in that generally the relatively important or critical locations and dimensions are established with respect to the new datum surfaces.

After the intermediate datum surfaces are established as part of step 126, the registration blocks 90A, 90C, 90E and 90F are removed (step 130). Removal of the registration blocks 90 can be accomplished through additional machining, which can be performed with reference to the intermediate datum surfaces. Then coatings are applied to the nozzle segment 88' (step 132). It should be noted that alternatively, coatings could be applied at earlier stages of the repair process as desired. For instance, line-of-sight coatings can be applied prior to joining (step 122) and non-line-of-sight coatings can be applied after joining.

Figure 5:
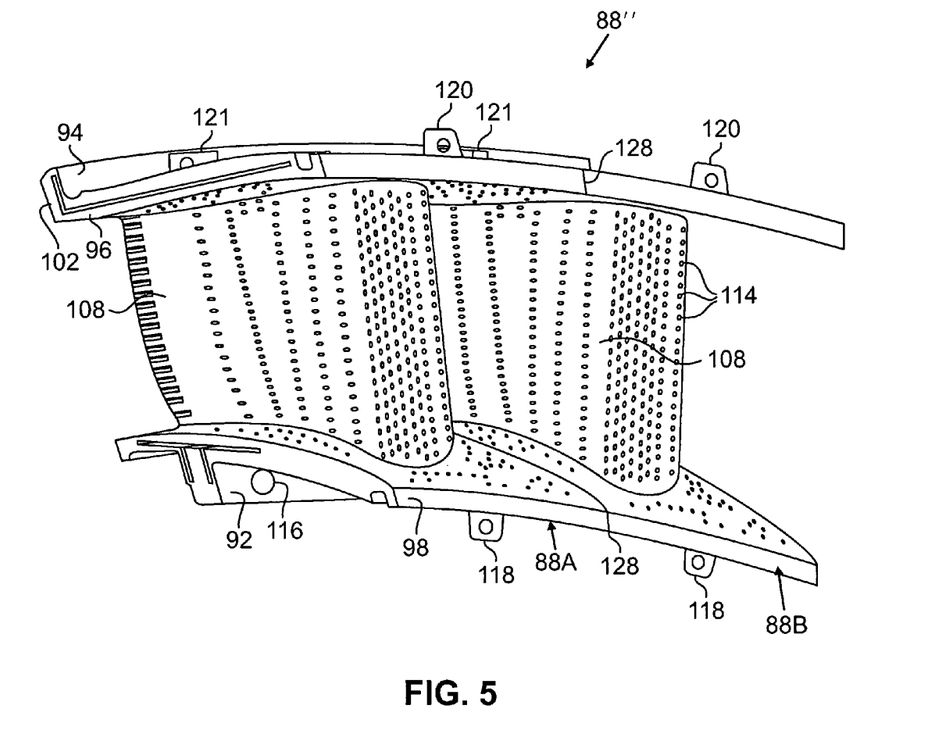
FIG. 5 is a perspective view of a repaired HPT nozzle segment.

FIG. 5 is a perspective view of a repaired HPT nozzle segment 88", after the repair process is fully complete. The repaired nozzle segment 88" matches original blueprint specifications with a relatively high degree of precision. After repairs are complete, the repaired nozzle segment 88" can be installed in an engine.

In view of the discussion above, it will be recognized that the present invention provides numerous advantages. For example, the use of registration blocks that establish new, fixed datums during repair allows a component to be repaired to original blueprint specifications with a greater degree of precision than with known methods.

Although the present invention has been described with reference to preferred embodiments, workers skilled in the art will recognize that changes may be made in form and detail without departing from the spirit and scope of the invention. For instance, various other procedures other than those specifically mentioned can be performed at various stages of the repair process according to the present invention. Moreover, the particular location where registration blocks are attached can vary to accommodate specific structures of parts being repaired, as well as to accommodate fixturing.

What is claimed is:

1. A method of repairing a vane cluster for a gas turbine engine, the method comprising:
   attaching a first registration block to a salvageable airfoil segment of the vane cluster;
   machining a face of the first registration block relative to datum surfaces of the vane cluster;
   removing a damaged airfoil segment from the vane cluster;
   adding new material to the salvageable airfoil segment;
   joining a replacement airfoil segment to the salvageable airfoil segment to replace the damaged airfoil segment, wherein the replacement airfoil segment includes a second registration block, and wherein the respective first and second registration blocks of the salvageable airfoil segment and the replacement airfoil segment are aligned in a configuration substantially identical to a configuration of the vane cluster prior to undergoing repair;
   removing the first registration block; and
   removing the second registration block.

2. The method of claim 1, wherein the damaged airfoil segment is removed by machining.

3. The method of claim 1 and further comprising:
   forming a hole in the first registration block relative to an original datum surface of the vane cluster.

4. The method of claim 1, wherein the replacement airfoil segment and the salvageable airfoil segment are joined by a brazing process.

5. The method of claim 1, wherein the replacement airfoil segment comprises at least one of: a salvaged part and a new part.

6. The method of claim 1, wherein the salvageable airfoil segment includes an outer platform portion, and wherein the first registration block is supported by the outer platform portion of the salvageable airfoil segment.

7. The method of claim 1 and further comprising:
attaching a third registration block to a salvageable airfoil segment of the vane cluster.

8. The method of claim 7, wherein the salvageable airfoil segment includes an inner platform portion, and wherein the first registration block is supported by the inner platform portion of the salvageable airfoil segment.

9. The method of claim 7 and further comprising:
machining a face of the third registration block relative to datum surfaces of the vane cluster.

10. The method of claim 7 and further comprising:
forming a hole in the third registration block relative to a datum surface of the vane cluster.

11. The method of claim 1, wherein the step of adding new material to the salvageable airfoil segment obliterates at least one of the datum surfaces of the vane cluster.

12. The method of claim 1, wherein the first registration block is attached to the salvageable airfoil segment by welding.

13. A method of repairing a vane cluster having a first segment with a first airfoil and a second segment with a second airfoil, wherein the first airfoil and the second airfoil are located with a defined relationship with respect to each other, the method comprising:
attaching reference structures to the first segment;
separating the first segment from the second segment;
discarding the second segment, wherein the second segment is damaged;
adding material to the first segment;
attaching a replacement segment to the first segment, wherein the replacement segment includes a third airfoil and reference structures, and wherein the reference structures of the first segment and the reference structures of the replacement segment are aligned such that the first airfoil and the third airfoil are located in a relationship to each other that is substantially the same as the original defined relationship between the first airfoil and the second airfoil; and
removing the reference structures from both the first segment and the replacement segment.

14. The method of claim 13, wherein the first segment and the second segment are separated by machining.

15. The method of claim 13 and further comprising:
forming a hole in each of the reference structures relative to an original datum surface of the vane cluster.

16. The method of claim 13, wherein the first segment and the replacement segment are attached to each other by welding.

17. The method of claim 13, wherein the replacement segment comprises a salvaged part.

18. The method of claim 13, wherein the first segment includes an outer platform portion and an inner platform portion, and wherein the reference structures are supported by the inner platform portion and the outer platform portion.

19. The method of claim 13 and further comprising:
machining a face of one of the reference structures of the first segment relative to a datum surface of the vane cluster.

20. The method of claim 13, wherein the first segment and the replacement segment are attached to each other by a brazing process.

* * * * *

UNITED STATES PATENT AND TRADEMARK OFFICE
CERTIFICATE OF CORRECTION

PATENT NO. : 8,220,150 B2  Page 1 of 1
APPLICATION NO. : 11/805136
DATED : July 17, 2012
INVENTOR(S) : Paul M. Pellet and David J. Hiskes It is certified that error appears in the above-identified patent and that said Letters Patent is hereby corrected as shown below:

Title Page: Item 54 and Col. 1, Line 1, TITLE
  Delete "SPLIT VANE CLUSTER REPAIR METHOD"
  Insert --SPLIT VANE REPAIR--

Signed and Sealed this
Ninth Day of October, 2012

David J. Kappos
*Director of the United States Patent and Trademark Office*